(No Model.)
W. C. IRVIN.
FASTENING FOR SECURING PULLEYS TO SHAFTS.
No. 458,580. Patented Sept. 1, 1891.
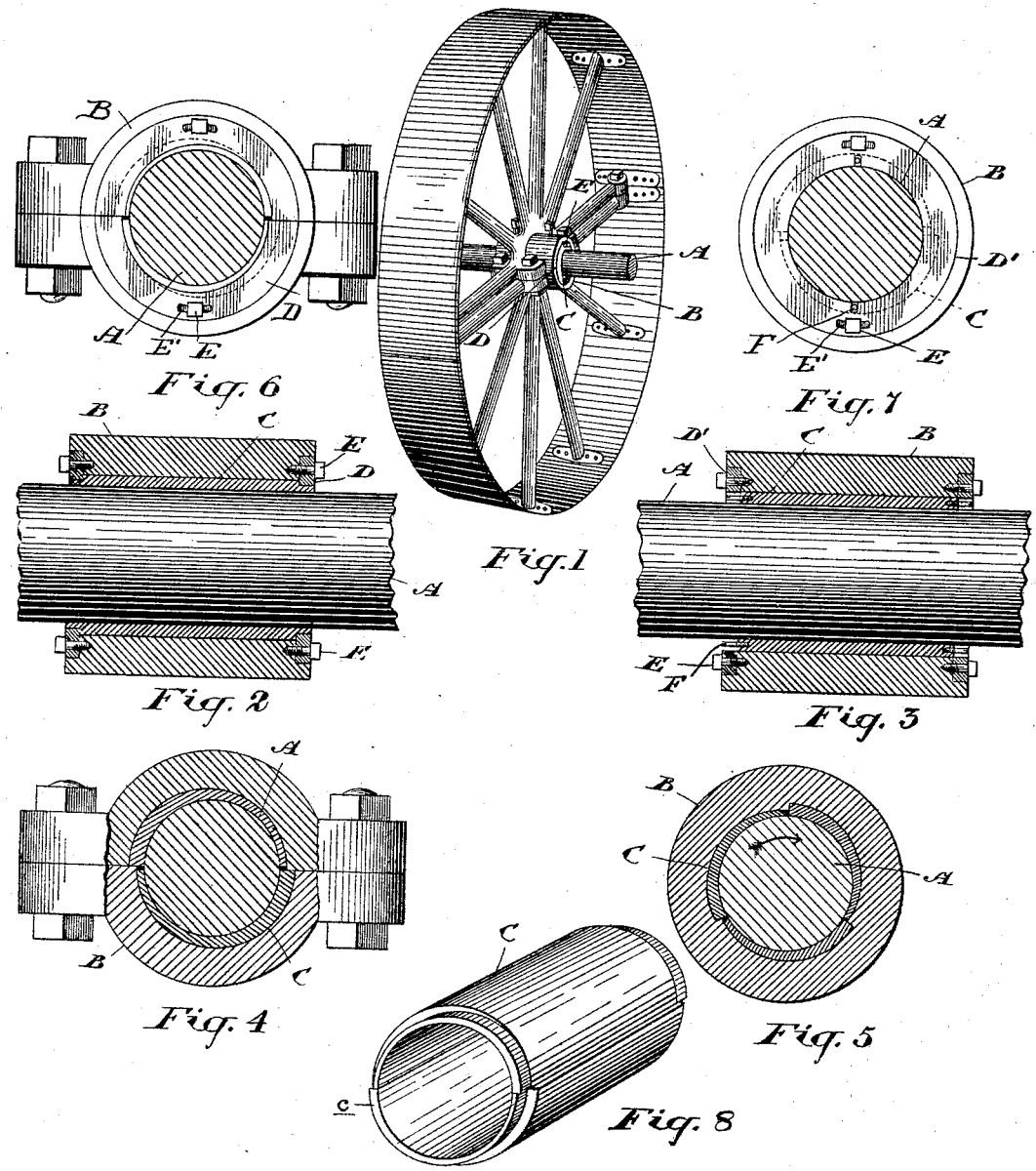

UNITED STATES PATENT OFFICE.

WILLIAM C. IRVIN, OF PONTYPOOL, CANADA.

FASTENING FOR SECURING PULLEYS TO SHAFTS.

SPECIFICATION forming part of Letters Patent No. 458,580, dated September 1, 1891.

Application filed December 11, 1890. Serial No. 374,341. (No model.)

*To all whom it may concern:*

Be it known that I, WILLIAM CHARLES IRVIN, of the village of Pontypool, in the county of Durham, in the Province of Ontario, Canada, have invented a certain new and Improved Fastening for Securing a Pulley to a Shaft, of which the following is a specification.

The object of the invention is to design a simple fastening by which a pulley may be firmly secured to a shaft without in any way interfering with the true balance of the said pulley; and it consists in the peculiar construction, arrangement, and combinations of parts, hereinafter more particularly described, and then definitely claimed.

Figure 1 is a perspective view of a split pulley provided with my improved fastening. Fig. 2 is a sectional side view of the hub and eccentric bushing. Fig. 3 is a sectional side view showing my eccentric bushing applied to a loose pulley to take up the wear. Fig. 4 is a cross-section of my eccentric bushing applied to a split pulley, as in Fig. 1. Fig. 5 is a cross-section of it applied to the hub of a solid pulley. Fig. 6 is a face view of the hub of a split pulley provided with my eccentric bushing and plates. Fig. 7 is a face view of a loose pulley provided with my eccentric bushing to take up the wear and a means for fastening the same. Fig. 8 is a perspective view of my eccentric bushing.

A represents a shaft, and B the hub of a pulley, which is bored eccentrically, as indicated in Figs. 4 and 5, to receive the eccentric bushing C, the interior surfaces of which are bored to fit the shaft A. Owing to the eccentric form of the bushing C the revolving of the shaft A in the direction indicated by arrow will cause the bushing to jam against and firmly grasp the shaft A, thus forming an absolutely solid connection between the two. It of course follows that when the shaft revolves in the opposite direction it will move the bushing C, so as to release itself.

With the view of preventing the pulley being released when it is not so desired I provide plates D, with eccentric interior faces made in the reverse form to the eccentricity of the bushing C, the periphery at the ends *c* of the said bushing being formed eccentric and in the opposite direction to the eccentricity of the body thereof, as indicated in Fig. 8, to receive the plates D, which are inserted into recesses, as shown in Fig. 2, formed in the hub B. These plates are held in position by the set-screws E, which pass through oblong holes E', made in the plates D, and are screwed into the hub B. When the shaft A or the pulley is revolved, so as to cause the bushing C to tightly grasp the shaft A, the plates D are adjusted so as to grasp the eccentric ends *c* of the bushing C, and the set-screws E are then tightened, so as to hold the plates in position. As the plates D are made eccentric in the opposite direction to the bushing C, they form clamps by which the shaft is firmly grasped should the pulley or the shaft be revolved in the reverse direction.

In Figs. 3 and 7 I show my eccentric bushing applied to a loose pulley to take up the wear. The ends of the bushing C are provided with pins F, projecting through slots formed in the plates D'. By revolving the plates D' the bushing C is tightened on the shaft, and the plates D' are then clamped fast by the bolts E, thus preventing any backward movement of the bushing.

What I claim as my invention is—

1. The eccentrically-bored hub B, in combination with a bushing C, bored to fit the shaft A and having its outer face eccentric reversely to the base of the hub, and an adjustable plate acting on said bushing and secured to the hub, substantially as described.

2. An eccentrically-bored hub and an eccentric bushing having its periphery at the ends formed eccentric in a direction opposite to the eccentricity of the body thereof, in combination with an adjustable plate having an inner eccentric face, said plate being secured to the hub and acting on the eccentric ends of said eccentric bushing, substantially as described.

3. An eccentrically-bored hub having an annular recess in each end thereof and an eccentric bushing having its periphery at its ends formed eccentric in a direction opposite to the eccentricity of its body, in combination with adjustable plates fitting in the annular recesses in said hub and having inner eccentric faces acting on the eccentric ends of the said eccentric bushing, said plates having slots therein, and bolts adapted to secure said plates to the hub, substantially as described.

Pontypool, November 21, 1890.

WILLIAM C. IRVIN.

In presence of—
   W. F. JOHNSTON,
      *Of Peterborough, a Notary Public.*
   EMILY CRANE,
      *Of Peterborough, Clerk.*